United States Patent [19]

McDonald

[11] Patent Number: 4,898,458
[45] Date of Patent: Feb. 6, 1990

[54] LAMINAR AIR FLOW EXTERIOR ADJUSTABLE REARVIEW MIRROR

[76] Inventor: William H. McDonald, P.O. Box 445, Londonderry, N.H. 03053-9998

[21] Appl. No.: 304,577

[22] Filed: Jan. 1, 1989

[51] Int. Cl.$^4$ .......................... B60S 1/56; B60R 1/06; G02B 7/18
[52] U.S. Cl. .................................................. 350/584
[58] Field of Search ............................... 350/584, 582

[56] References Cited

U.S. PATENT DOCUMENTS

| | | | |
|---|---|---|---|
| 2,796,506 | 6/1957 | Lumbert | 350/584 |
| 3,059,540 | 10/1962 | Robinson | 350/584 |
| 4,580,881 | 4/1986 | Kim | 350/584 |

FOREIGN PATENT DOCUMENTS

| | | | |
|---|---|---|---|
| 248550 | 8/1987 | Fed. Rep. of Germany | 350/584 |
| 44054 | 3/1980 | Japan | 350/584 |
| 1020576 | 2/1966 | United Kingdom | 350/584 |
| 1515934 | 6/1978 | United Kingdom | 350/584 |
| 2048191 | 12/1980 | United Kingdom | 350/584 |
| 2058695 | 4/1981 | United Kingdom | 350/584 |

*Primary Examiner*—Jon W. Henry

[57] ABSTRACT

This disclosure relates to an improved exterior adjustable rearview mirror for motor vehicles, with air flow apertures designed and arranged for the removal of moisture, dust, debris and the like from the viewing surface of a rearview mirror mounted therein.

The exterior adjustable rearview mirror attached to the front side window, in a manner known per se, consists of a fixed rigid rearview mirror housing with a rearwardly opening providing visibility to an adjustable rearview mirror therein. An air intake aperture is formed on the forwardly directed wall of the rearview mirror housing structure, with respect to the direction of travel of the motor vehicle. The air intake aperture serves to direct the flow of air through a vertical air compression chamber within the rearview mirror housing structure. Hence, the flow of air travels out through the air exhaust aperture located above the viewing surface of the rearview mirror. The flow of air exiting the air exhaust aperture applies a force on the viewing surface of the rearview mirror in such a manner whereby moisture, dust, debris, and the like is forced in a vertical direction off the viewing surface of the mirror, as the motor vehicle with the attached exterior adjustable rearview mirror travel in a forward direction.

In addition, the design of the air compression chamber together with the moisture sump depression and the moisture weep duct will remove airborne moisture which may be captured within the device. This moisture is removed and is not distributed onto the viewing surface of the rearview mirror.

7 Claims, 3 Drawing Sheets

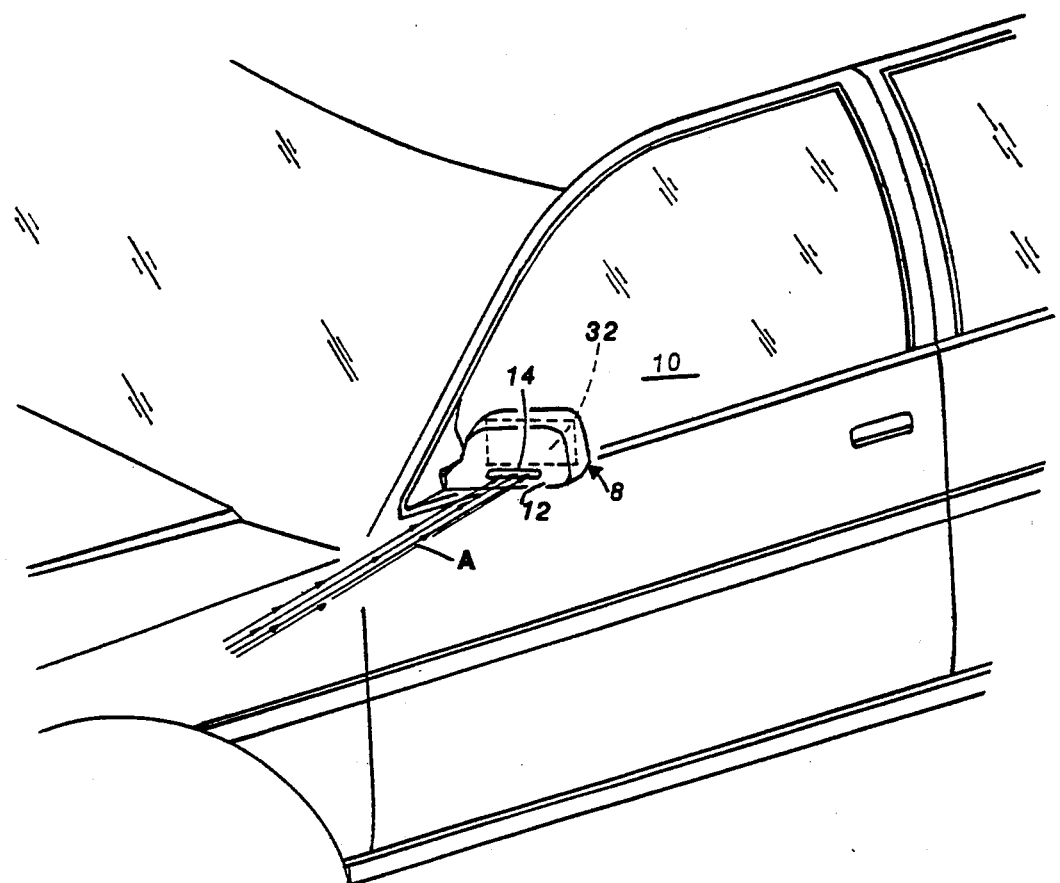
Figure No. 1
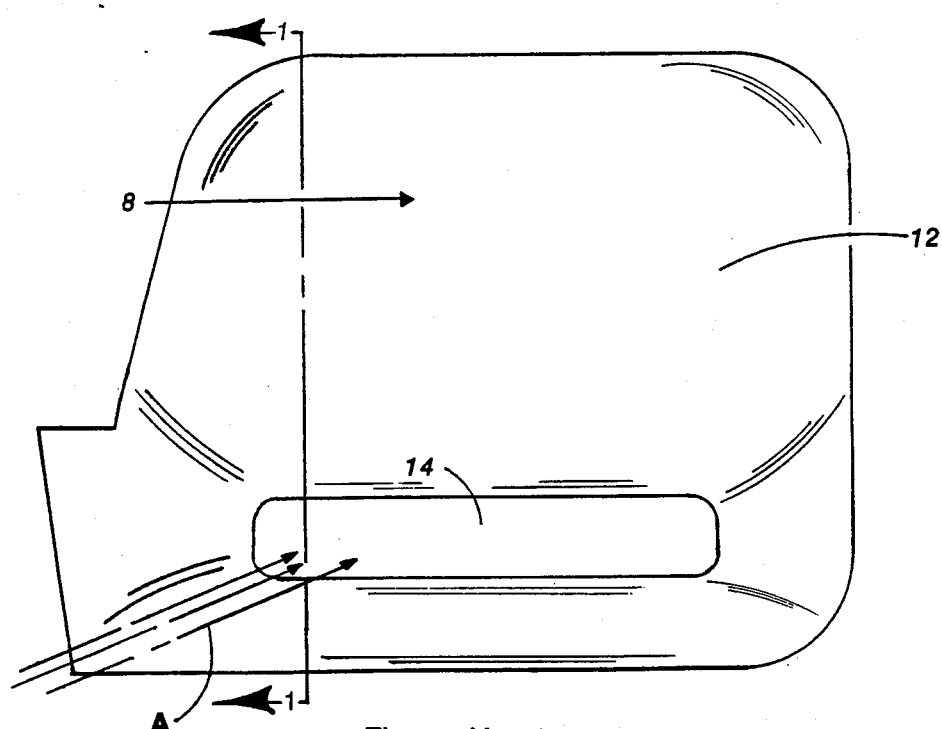
Figure No. 2

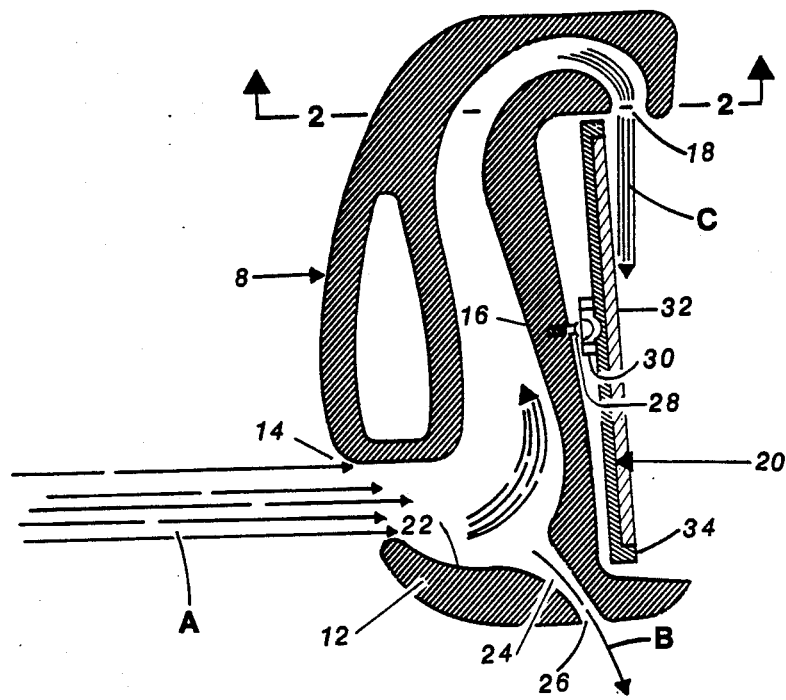
Figure No. 3
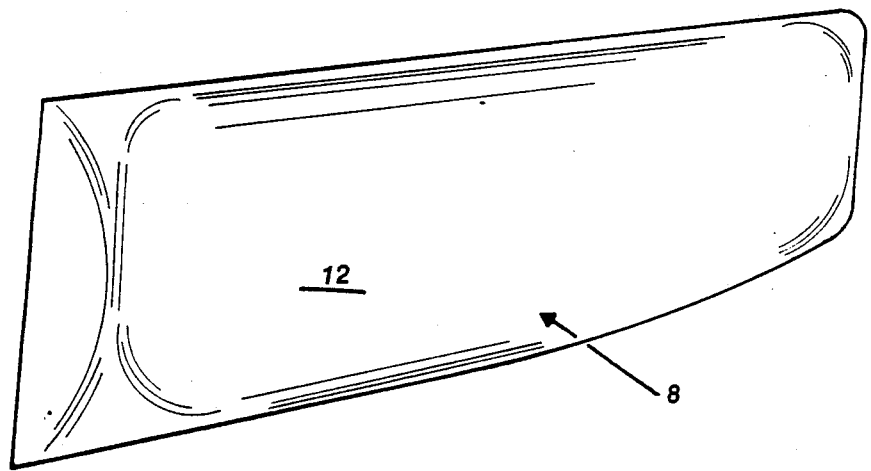
Figure No. 4

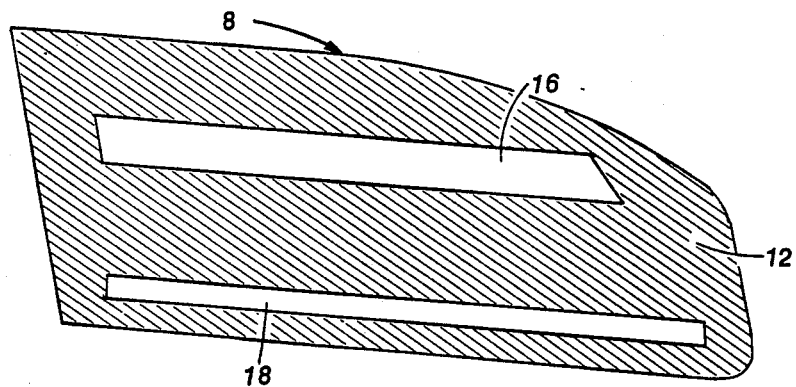
Figure No. 5
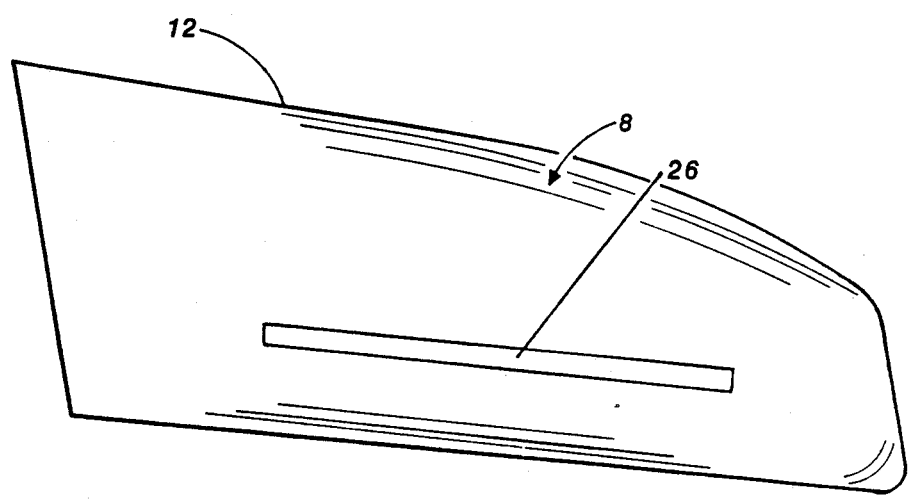
Figure No. 6

LAMINAR AIR FLOW EXTERIOR ADJUSTABLE REARVIEW MIRROR

BACKGROUND

1. Field of Invention

Today, there exist several million motor vehicles throughout the world. As such, with increased congestion on the highways, the concern for improving safety conditions has been recognized. Increasing visibility is one way of enhancing the safety of those who operate motor vehicles. Today, the exterior rearview mirror has become an integral element to motor vehicles due to the safety which they provide. The use of two (2) exterior rearview mirrors (one mounted on both left the and right sides of the vehicle) is rapidly becoming more popular due to the added safety rearview mirrors can provide.

Moisture will collect on the viewing surface of exterior rearview mirrors during times of precipitation. This condition has the ability to distort the reflective properties of images viewed therein. This situation is further compounded during periods of darkness when the reflection of headlights upon the moisture covered rearview mirror creates additional visual distortion to images viewed therein.

This invention relates to an exterior rearview mirror attached to motor vehicles, specifically an improved exterior rearview mirror which will direct the flow of air over the viewing surface of the mirror in such a manner whereby moisture, dust, debris and the like will be removed from the viewing surface of an exterior rearview mirror as the motor vehicle travels in a forward direction.

2. Description of Prior Art

Various improvements have been made to exterior rearview mirrors including but not limited to; remote movement mechanisms (e.g. mechanical means to move mirrors from inside an automobile with the windows up), reduced glare viewing surfaces and structural housings designed to improve the aerodynamics of air flow around the circumference of the mirror, and mechanical wiper assemblies.

An examination of prior art has revealed two (2) design patents, D282535 and D282458 both granted from the U.S. Pat. Nos. and Trademark Office to Mr. Flavius L. Whittington. The ornamental design claim of each differs substantially from the claims in this patent application in that the aforementioned ornamental designs represent "add on" attachment devices to exterior mirrors intended to deflect air onto the viewing surfaces of exterior rearview mirrors. These ornamental designs have no provisions for decreasing the moisture content of the air circulating over the viewing surface of the mirrors which they are attached too.

A U.S. Pat. No. 3,598,469 was granted to Mr. William J. Landen on Aug. 10, 1971. Through the use of air pressure gradients resulting from the forward motion of a motor vehicle, moisture would be removed from the viewing surface of an exterior rearview mirror. However, this invention did not have any provisions to directly apply the flow of air onto the viewing surface of the mirror nor did it have any provisions to increase the velocity of air circulating about the viewing surface of the rearview mirror.

OBJECTIVES AND ADVANTAGES

Accordingly, I claim as my objectives and advantages: A primary objective of the invention was to establish an exterior adjustable rearview mirror whereby the flow of air resulting from the forward motion of a motor vehicle would clear moisture, dust, debris and the like from the viewing surface of a rearview mirror without the aid of any additional mechanical device.

In addition the exterior rearview mirror, through the properties unique to this invention, directs the flow of air vertically down over the viewing surface of an adjustable rearview mirror; the velocity of the exhaust air flow directed onto the viewing surface of the exterior rearview mirror will be higher than the velocity of the intake air flow; the design of the vertical air compression chamber together with the sump depression, moisture weep duct, and moisture weep orifice will provide for the removal of moisture from the intake air flow; the structural shape of an adjustable rearview mirror, as the vehicle travels forward, thus removing moisture, dust, debris and the like from said viewing surface.

The features of this invention are believed to be novel and are particularly described and defined in the concluding portion of this specification.

The reader will find further objectives and advantages of the invention from a consideration of the ensuing description and accompanying drawings.

DRAWING FIGURES

FIGS. No. 1 through No. 6 illustrate the exterior rearview mirror attached in a manner per se to a motor vehicle. The design of the housing for application on the right side of the vehicle would be reversed and symmetrical to the following Figures:

FIG. 1. illustrates a perspective view of an exterior rearview mirror (8) arranged to rest against the front side window (10), in a manner known per se, of a motor vehicle. As the motor vehicle travels in a forward direction the flow of air impinging on the exterior rearview mirror, shown by arrows A, enters the rearview mirror housing structure (12) through the air intake aperture (14).

FIG. 2. illustrates the front elevation of the invention also known as the forwardly elevation of said invention with respect to the direction of travel of the motor vehicle.

FIG. 3. illustrates a sectional view along line 1—1 shown in FIG. No. 2 of the invention thereof.

FIG. 4. illustrates a top view of the invention thereof.

FIG. 5. illustrates a bottom view of the invention thereof.

FIG. 6. illustrates the sectional view along line 2—2 shown in FIG. No. 3 of the invention thereof.

DRAWING REFERENCE NUMERALS 8 exterior adjustable rearview mirror
10 front side window of motor vehicle
12 rearview mirror housing structure
14 air intake aperture for 12
16 air compression chamber for 12
18 air exhaust aperture for 12
22 moisture sump depression
24 moisture weep duct for 12
26 moisture weep orifice for 24
28 swivel post
30 swivel seat for 28
32 rearview mirror 34 backplate for 32

DESCRIPTION

FIG. 1., an exterior adjustable rearview mirror (8) is arranged to rest against the front side window (10) of a motor vehicle in a manner known per se. The exterior adjustable rearview mirror (8) in FIG. 1. essentially illustrates a rearview mirror housing structure (12) which circumscribes a rearview mirror shown in FIG. No. 5, while providing an air intake aperture (14) on the forwardly side of the rearview mirror housing structure (12), with respect to the direction of travel of the motor vehicle. The flow of air (A) enters the rearview mirror housing structure (12) through the air intake aperture (14) as the motor vehicle travels in a forward direction.

In FIG. 2., the front elevation of the exterior adjustable rearview mirror (8) is illustrated. Specifically, the forwardly portion of the rearview mirror housing structure (12), with respect to the direction of travel of the motor vehicle, has an air intake aperture (14). The air intake aperture (14) permits the flow of air (A), as the vehicle travels in a forward direction, to enter into the rearview mirror housing structure (12) as further described and illustrated in FIG. 3.

In FIG. 3., the exterior rearview mirror (8) is illustrated in a sectional view along line 1—1 in FIG. 2. The air intake aperture (14) with its orifice located on the forwardly portion of the rearview mirror housing structure (12), permits the flow of air (A) into the vertical air compression chamber (16), as the motor vehicle travels in a forward direction. The flow of air (A) is forced through the air compression chamber (16) and exits the rearview mirror housing structure (12) through the air exhaust aperture (18) located directly over the viewing surface of the rearview mirror (32) shown as air flow (C).

The air compression chamber (16) is inclined in a vertical position. This will serve to decrease the amount of moisture that may be present in air flow (A) that enter through the air intake aperture (14) and exits the air exhaust aperture (18). Located at the bottom of the air compression chamber (16) is a moisture sump depression (22) which allows air flow (B) together with collected moisture to exit the rearview mirror housing structure (12) through the moisture weep duct (24). The moisture weep orifice (26) is located on the bottom of the rearview mirror housing structure (12), and is positioned to expel air flow (B) together with any collected moisture in a downwardly direction away from the rearview mirror housing structure (12).

Several methods of providing adjustability to the rearview mirror are feasible. Here, the rearview mirror housing structure (12) provides a swivel post (28) with a rotatable swivel seat (30) formed into the backplate (34) which holds the rearview mirror (32).

In FIG. 4., a top view of the invention is shown.

In FIG. 5., a bottom view of the invention is shown. In this FIGURE the position of the moisture weep orifice (26) is shown.

In FIG. 6., a sectional view is shown along line 2—2 in FIG. 2. This Figure illustrates the air intake aperture (16) and the air exhaust aperture (18) as they relate to the external adjustable rearview mirror (8).

OPERATION

A vehicle mounted with the rearview mirror housing as described herewith, permits the flow of air to enter the air intake aperture illustrated in FIGS. No. 1 and 3., as the vehicle travels in a forward direction. The flow of air will travel through the air compression chamber and will exit through the air exhaust aperture and the moisture weep orifice altogether shown in FIG. No. 3. The reader will see that opening of the air intake aperture is larger than the opening of the air exhaust aperture shown in FIG. No. 3. The differential in the aperture areas, as illustrated in FIG. No. 3, will created internal air pressure within the air compression chamber illustrated in FIG. No. 3. As a result, the exhaust air flow velocity exiting will be greater than the intake air flow velocity.

The air intake aperture has a lower elevation than the air exhaust aperture as shown in FIG. No. 3. The air compression chamber bends to an approximate vertical position as shown in FIG. No. 3. FIG. No. 3 also illustrates a moisture weep duct and moisture weep orifice. These three (3) features of the invention will act to decreased the amount of moisture that would exit the air exhaust aperture should moisture enter the air intake aperture while the invention is in operation.

Thus, the reader will see that the improved exterior adjustable rearview mirror set forth and described herewith is a highly reliable, yet economical device which will direct the flow of air over the viewing surface of an exterior rearview mirror for motor vehicles in such a fashion that the invention applies an air flow force upon the viewing surface of the mirror, as the vehicle travels forward, thus removing moisture, dust, debris and the like from said viewing surface.

While the aforementioned description of the invention and its operation contains many specificities, these should not be taken as limitations on the scope of the invention, but rather as an exemplification of one preferred embodiment thereof. Many other variations are possible. For example skilled artisans will readily be able to change the dimensions and shapes of various embodiments such as the shape and location of the air intake aperture shown in FIGS. 1., 2., and 3. The shape or location of the air exhaust aperture shown in FIGS. No. 3 and No. 6 could be modified. They could make variations on the shape of the air compression chamber illustrated in FIG. No. 3, or they could modify the velocity ratio of the intake air flow to the exhaust air flow through a modification of the aforementioned potential variations. The mirror housing could be constructed of almost any rigid material. The attachment of the rearview mirror housing to the exterior of a motor vehicle could be accomplished through a variety of designs and/or construction techniques. The forwardly portion of the mirror housing could be designed to modify the aerodynamic features of the mirror housing. Additional mechanisms, to increase or decrease the size of either the air intake or exhaust apertures could be made. In addition, a housing unit could support other design features outside the realm of the appended claims of this invention.

Accordingly, the scope of the invention should be determined not by the embodiments illustrated, but by the appended claims and their legal equivalents, and not by examples which have been given.

I claim:

1. A laminar air flow exterior adjustable rearview mirror for motor vehicles, comprising:
   (a) a rearview mirror housing structure constructed of rigid material circumscribing an adjustable rearview mirror situated therein, attached to the exterior portion of a motor vehicle;

(b) said structure surrounding the rearview mirror comprising of an air intake aperture located on the forwardly portion of the structure, with respect to the forward motion of the vehicle exposed to the flow of air resulting from said motion of the vehicle, communicating with a vertically oriented curvilinear shaped air compression chamber integral to the mirror housing structure, and situated and integral to a semi-spherical moisture sump depression formed within the bottom of said chamber, and a moisture weep duct integrated and connecting the moisture sump depression with an oblong formed moisture weep orifice opening situated on the lowest elevation of the rearview mirror housing structure through which moisture present in said depression may pass, and a rearview mirror situated within the cavity of the mirror housing structure, attached to an adjustable movement mechanism providing infinite angular movements to said mirror, and an oblong formed air exhaust aperture situated adjacent to the rearwardly side of the rearview mirror housing structure, positioned vertically over the rearview mirror, and communicating with the verically oriented curvilinear shaped air compression chamber in combination, (c) a means depleting moisture from the flow of air entering into the invention, through the air intake aperture, as the vehicle with invention attached thereto travel in a forward direction and, (d) a means creating increased atmospheric air pressure within the portion of the invention, subject to encountered inflow of air through the air intake aperture, as the vehicle with invention attached thereto travel in a forward direction and, (e) a means increasing the velocity and momentum of the exhaust air flow, which permeates the air exhaust aperture, relative to intake air flow, as the vehicle with invention attached thereto travel in a forward direction and, (f) a means directing the exhaust air flow, which permeates the air exhaust aperture, vertically over the viewing surface of an exterior infinitely adjustable rearview mirror situated within the rearview mirror housing structure, as the vehicle with invention attached thereto travel in a forward direction and, (g) a means creating an air flow momentum, in proportion with the vehicle speed, onto the viewing surface of the adjustable rearview mirror, and any vapor or particulate matter thereon, as the vehicle with invention attached thereto travel in a forward direction.

2. A laminar air flow exterior adjustable rearview mirror according to claim 1 with an air compression chamber situated between the forwardly portion of the rearview mirror housing structure and the rearview mirror.

3. A laminar air flow exterior adjustable rearview mirror according to claim 1 with an air intake aperture opening on the forwardly side of the mirror housing structure that is larger than the combined surface area openings of the oblong air exhaust aperture and moisture weep orifice.

4. A laminar air flow exterior adjustable rearview mirror according to claim 1 with a higher atmospheric air pressure inside the air compression chamber than the atmospheric air pressure external to the air compression chamber when the vehicle with the invention attached thereto travel in a forward direction.

5. A laminar air flow exterior adjustable rearview mirror according to claim 1 with an oblong moisture weep orifice which is located below the elevation of the semi-spherical formed moisture sump depression.

6. A laminar air flow exterior adjustable rearview mirror according to claim 1 wherein the location of the oblong moisture weep orifice is on the rearwardly side of the rearview mirror housing structure with respect to the direction of travel of the vehicle.

7. A laminar air flow exterior adjustable rearview mirror according to claim 1 with a higher air flow velocity and momentum exiting the moisture weep orifice than the air flow velocity and momentum that enters the air intake aperture while the vehicle with the invention attached thereto travel in a forward direction.

* * * * *